United States Patent [19]

Inoue et al.

[11] Patent Number: 5,044,172
[45] Date of Patent: Sep. 3, 1991

[54] AIR CONDITIONING APPARATUS

[75] Inventors: Yoshinori Inoue, Takarazuka; Masao Endo, Sennan; Shinji Miura, Suita, all of Japan

[73] Assignee: Takenaka Corporation, Osaka, Japan

[21] Appl. No.: 393,922

[22] PCT Filed: Oct. 30, 1987

[86] PCT No.: PCT/JP87/00842

§ 371 Date: Aug. 24, 1989

§ 102(e) Date: Aug. 24, 1989

[87] PCT Pub. No.: WO89/03962

PCT Pub. Date: May 5, 1989

[51] Int. Cl.⁵ .................................................. F25B 7/00
[52] U.S. Cl. ......................................... 62/335; 62/59; 62/435
[58] Field of Search ................... 62/59, 335, 434, 435, 62/436, 185, 438

[56] References Cited

U.S. PATENT DOCUMENTS

| | | | |
|---|---|---|---|
| 2,797,068 | 6/1957 | McFarlan | 62/335 X |
| 2,935,857 | 5/1960 | McFarlan | 62/435 |
| 2,984,458 | 5/1961 | McFarlan | 62/435 X |
| 3,067,592 | 12/1962 | McFarlan | 62/335 X |
| 4,000,626 | 1/1977 | Webber | 62/335 X |
| 4,104,890 | 8/1978 | Iwasaki | 62/335 X |
| 4,294,083 | 10/1981 | King | 62/59 X |
| 4,302,944 | 12/1981 | Gainer | 62/59 |
| 4,827,735 | 5/1989 | Foley | 62/59 X |

Primary Examiner—Lloyd L. King
Attorney, Agent, or Firm—Edwin E. Greigg; Ronald E. Greigg

[57] ABSTRACT

An air conditioning apparatus having a cold accumulating cycle including a first compressor, a first condensor, a first decompressing mechanism and a heat accumulator and a refrigerating cycle including a second compressor, a second condensor, a second decompressing mechanism and an evaporator, wherein the heat accumulating cycle and the refrigerating cycle are provided independently of each other and in that a cooling device using the evaporator as cooling means serves for cooling by utilizing heat accumulated in the heat accumulator thereby constituting a cold transfer circuit.

17 Claims, 3 Drawing Sheets

AIR CONDITIONING APPARATUS

FIELD OF THE INVENTION

The present invention relates to an air conditioning apparatus utilizing a cold accumulating-cooling cycle.

BACKGROUND OF THE INVENTION

Demand for electricity is at its peak during daytime in summer season. For coping with such an occasion, there is suggested an apparatus in a Japanese utility model laying-open gazette issued under No. 60-1543. This apparatus is designed such that a compressor consuming the largest amount of electricity in the apparatus is stopped on such occasion and cooling of rooms is carried out instead by cold which has been accumulated in a heat accumulator during a time other than the peak time.

However, in the case of the above-described apparatus, since the same compressor, condensor and decompressing mechanism are co-utilized both in the cold accumulating cycle and in the cooling cycle, there occur such problems as will be described next.

A switching operation between the cold accumulating cycle and the cooling cycle is carried out by means of switching valves provided in the respective cycles. However, since the decompressing mechanism is co-utilized in the two cycles, it is difficult to adjust the decompressing mechanism to provide its optimum performance for each of the cycles, thereby impairing the total performance of the air conditioning apparatus. More specifically, control operation for electric load variation is not carried out linearly, and the cooling temperature of the apparatus violently varies with a power-on or off of the compressor. Further, since there occurs a zoning phenomenon with each of the compressors, it is difficult to partition a space into a plurality of rooms such that each room may be most comfortably air-conditioned.

Moreover, since the conventional apparatus comprises an integral type incorporating both the indoor unit and the outdoor unit, it is costly and troublesome to install additional apparatuses. Also, because of the one-to-one correspondence between the indoor unit and the outdoor unit, if it is desired to install a plurality of indoor units, the same number of outdoor units need be installed as well, whereby there occurs a necessity of obtaining a large space for the installment of the outdoor units.

Being the integral type incorporating the indoor unit and the outdoor unit including the heat accumulator, the conventional apparatus inherently has only a small cold accumulating capacity. Due to this limited cold accumulating capacity, the cold accumulated out of the peak time is consumed in a short time period, and thus the apparatus is not capable of significantly contributing to the improvement of the aforementioned tight electricity demand situation. Furthermore, in a building having load characteristics of 24 hour air conditioning (cooling cycle), it is impossible to operate the apparatus for the cold accumulating cycle.

With a view toward apparatus maintenance, if the compressor fails, there is no means to back up the apparatus. Also, since the heat accumulating tank is disposed in the indoor unit, there is danger of water leakage, or if the apparatus is installed in a building, the great number of heat accumulating tanks makes the maintenance difficult.

SUMMARY OF THE INVENTION

Taking the above-described state of the art into consideration, it is the object of the present invention to provide an air conditioning apparatus utilizing a cold accumulating-cooling cycle achieving an improved air conditioning performance.

In order to accomplish the above object, an air conditioning apparatus related to the present invention having a cold accumulating cycle including a first compressor, a first condensor, a first decompressing mechanism and a heat accumulator and a refrigerating cycle including a second compressor, a second condensor, a second decompressing mechanism and an evaporator, wherein the cold accumulating cycle and the refrigerating cycle are provided independently of each other and wherein a cooling device using the evaporator as cooling means serves for cooling by utilizing cold accumulated in the heat accumulator thereby constituting a cold transfer circuit.

Functions and effects of the above features will be described next.

Since the cold accumulating cycle and the refrigerating cycle are provided independently of each other with the former including the first compressor, first condensor, first decompressing mechanism and the heat accumulator and the latter including the second compressor, second condensor, second decompressing mechanism and the evaporator, it is possible to adjust each decompressing mechanism to provide its optimum performance for the respective cycle.

As the result, the total air conditioning efficiency of the apparatus has been considerably improved. More particularly, cold is accumulated by the cold accumulating cycle off the peak of the electricity consumption, and during the peak, the condensors are turned off or decelerated and the apparatus carries out cooling by using the accumulated cold of the heat accumulating cycle or by using the same with the refrigerating cycle in combination, whereby temperature adjustment in the respective cold accumulating and refrigerating cycles may be carried out under the optimum condition by controlling the decompressing mechanisms.

Accordingly, a power-on or off of the compressor of the cold accumulating cycle per se does not cause any violent changes in the cooling temperature of the air conditioning apparatus, thereby providing comfortable cooling.

Moreover, in the case of the present invention, since it is possible to make such arrangements as to use in combination a direct expansion multi-stage loop system with the cold accumulating-cooling system thereby providing a double-coil control or to install this combination in a plurality of partitioned rooms, the apparatus may provide very comfortable air conditioning. Furthermore, in the case of the air conditioning apparatus of the present invention, it is readily possible to additionally install one or desired number of indoor units including a cooling coil and fan constituting the cold accumulating-cooling system or to share a single outdoor unit with a plurality of indoor units by the direct expansion multi-stage loop system, thereby achieving good space economy and good installation flexibility. In installing additional indoor units, if it is desired to improve the performance of the air-conditioning system, the compressor and the condensor in the refrigerating cycle may be changed or the heat-accumulating tank or the compressor and the condensor in the cold-accumulating cycle may be changed. That is to say, the whole air-conditioning system need not be replaced.

In addition, in the case of the present invention, as described above, if the direct expansion multi-stage loop system is used in combination with the cold accumulating-cooling system, it becomes possible to stop or decelerate the compressors for a longer time period to provide an effective peak shift, whereby the apparatus may considerably contribute to easing the tight electricity demand situation. Also, since the direct expansion multi-stage loop system and the cold accumulating-cooling system may be operated independently of each other, the cold accumulating operation is possible even in such a building as described hereinbefore having the 24 hour air conditioning (cooling cycle) load characteristics.

Further, compared with the conventional apparatus, the air conditioning apparatus of the present invention provides more reliable performance thanks to the larger back-up capacity of the cold accumulating-cooling system.

Also, since it is possible to concentrate the heat accumulating tank, the apparatus of the present invention is easy to maintain and safer against the water leakage.

Other features and merits of the apparatus will become more apparent from the following description of the preferred embodiments with reference to the accompanying drawings.

DESCRIPTION OF THE PREFERRED EMBODIMENTS

Preferred embodiments of an air conditioning apparatus utilizing a cold accumulating-cooling cycle related to the present invention will be particularly described hereinafter with reference to the accompanying drawings.

Figure 1:
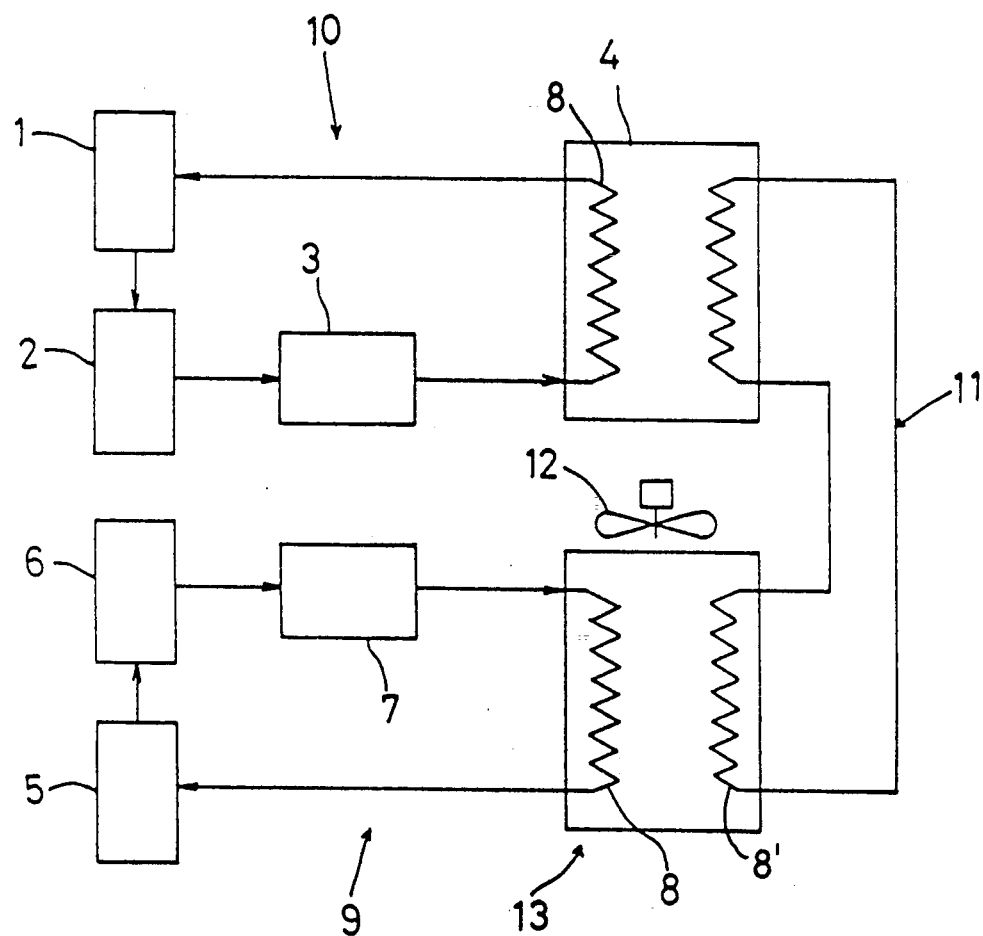
FIG. 1 is a principle explanatory view of an air conditioning apparatus utilizing a cold accumulating-cooling cycle related to the present invention.

FIG. 1 is a principle explanatory view of the air conditioning apparatus of the present invention. Referring to this figure, a reference numeral 10 denotes a cold accumulating cycle including a first compressor 1, a first condensor 2, a first decompressing mechanism 3 and a heat accumulator 4 to which such cooling medium as water, freon or the like is supplied. The cold is accumulated in heat accumulating material filled in the heat accumulator 4. A reference numeral 9 denotes a refrigerating cycle provided independently of the abovementioned cold accumulating cycle 10. This refrigerating cycle 9 includes a second compressor 5, a second condensor 6, a second decompressing mechanism 7 and an evaporator 8. This evaporator 8 and a fan 12 together constitute a cooling device 13 which carries out room air conditioning.

As described above, the cold accumulating cycle 10 and the refrigerating cycle 9 are provided independently of each other. Between the heat accumulator 4 and the cooling device 13, there is provided a cold transfer circuit 11 filled with cooling medium. Through this circuit 11, the cold is transferred between the heat accumulator 4 and the cooling device 13, and this cooling device 13 carries out cooling operation by utilizing the cold accumulated in the heat accumulator 4.

When the electricity consumption is not at its peak, the first compressor 1 of the cold accumulating cycle 10 is intensely operated to accumulate cold in the heat accumulator 4. On the other hand, when the electricity consumption is at its peak, this first compressor 1 of the cold accumulating cycle 10 is deenegized or decelerated and cooling operation is carried out by the cooling device utilizing the cold transfer through the cold transfer circuit 11 or the cooling operation is carried out by the refrigerating cycle 9 and the cold transfer circuit 11 by activation or deceleration of the second compressor 5 of the refrigerating cycle 9.

With the above construction, since the first compressor 1 of the cold accumulating cycle 10, the first decompressing mechanism 3 of the first condensor 2, the second condensor 6 of the cooling cycle 9 and the second decompressing mechanism 7 for the second compressor 5 are provided independently of one another, it is possible to operate the first and the second decompressing mechanisms 3, 7 independently of each other. Consequently, it is possible for the heat accumulator 4 to carry out its cold accumulating operation and for the cooling device 13 to carry out its cooling operation under the optimum condition by the first and the second decompressing mechanisms 3, 7.

Nextly, there will be particularly described a case in which an indoor air conditioning operation is carried out by the air conditioning apparatus utilizing the cold accumulating-cooling cycle related to the present invention.

Figure 2:
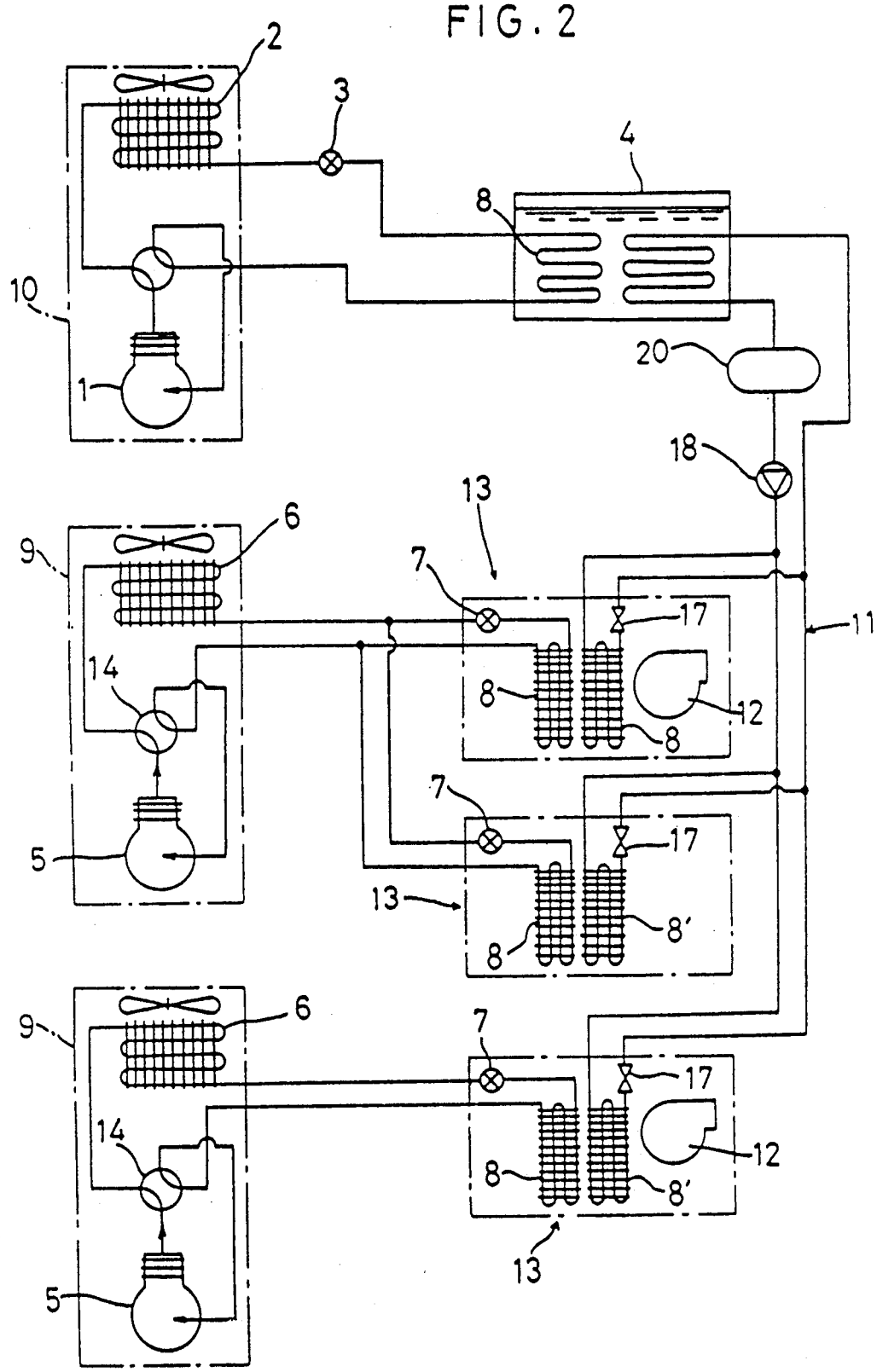
FIGS. 2 and 3 are schematic explanatory views showing the air conditioning apparatus of the present invention disposed in a room.
Figure 3:
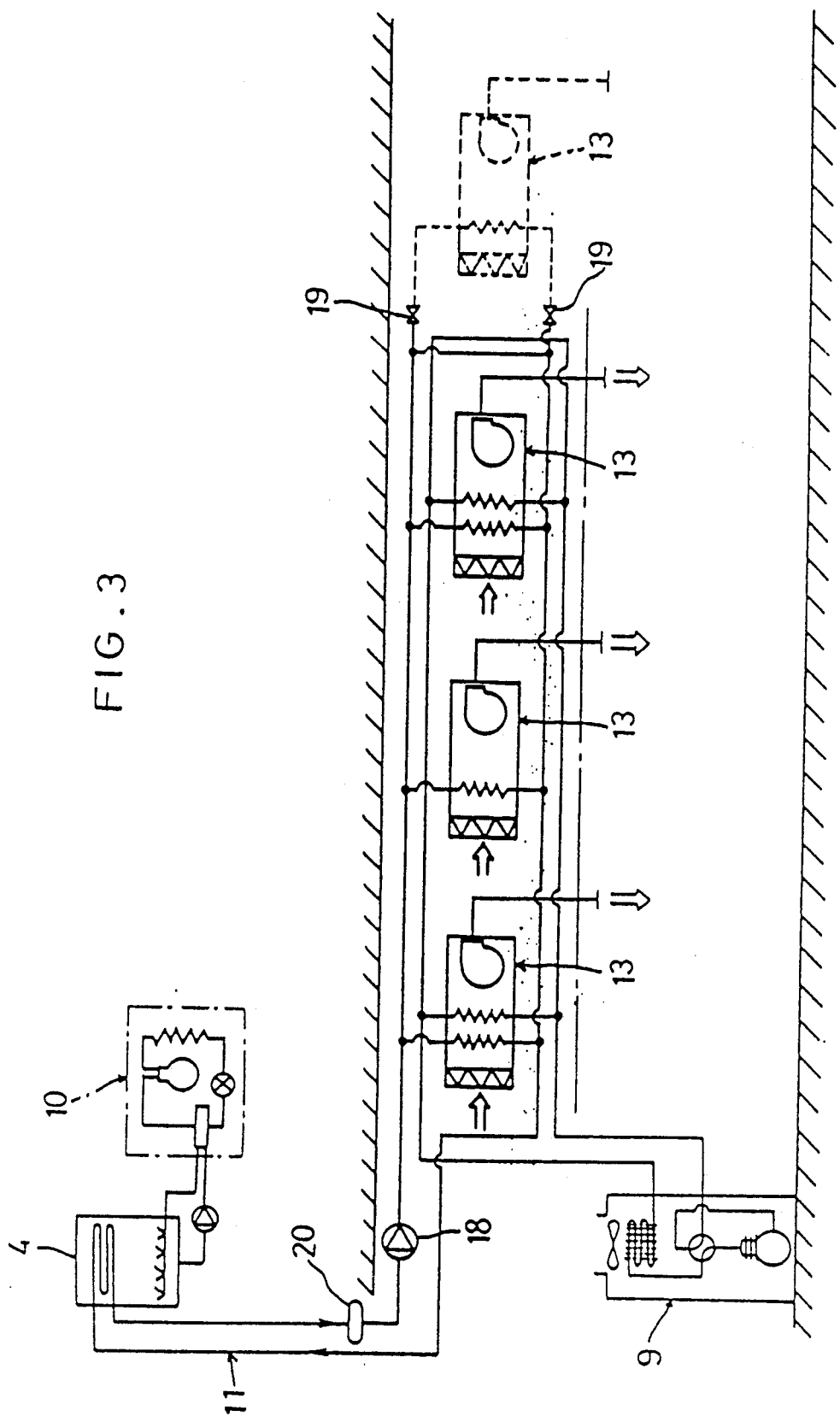

Referring now to FIGS. 2 and 3, the reference numeral 4 denotes the heat accumulator which is operatively connected with the cooling devices 13 respectively disposed in a room. The reference numeral 9 denotes the refrigerating cycle including a four-way valve 14, the compressor 5, the condensor 6 and so on.

On the other hand, the heat accumulator 4 is disposed outdoors or the like and in which the cold is accumulated by the cold accumulating cycle 10 off the electricity consumption peak. The reference numeral 11 denotes the cold transfer circuit which is operatively connected to the respective cooling devices 13 disposed indoors. In the cold transfer circuit 11, there are conveniently disposed a control valve 17 and a pump 18, such that the cooling medium may be forcibly supplied into each room by being switched to the heat exchanger means 8' in cooling device 13 disposed in each room. Further, a reference numeral 19 denotes an electromagnetic valve and a numeral 20 denotes a liquid reservoir.

Alternately, the heat accumulator 4 may be connected with a plurality of sets of the first compressor 1, the first condensor 2 and the first decompressing mechanism 3. Or, the evaporator 8 may be connected with a plurality of sets of the second compressor 5, the second condensor 6 and the second decompressing mechanism 7.

Further, in the cold accumulating-cooling cycle, the heat accumulating material of the heat accumulator 4 may be used as the cooling medium. Also, in the cold accumulating-cooling cycle, the cold transfer circuit may comprise a natural circulation type or may also comprise a forced circulation type activated by a pump.

Further, in case a forcibly circulated cooling medium constitutes a gas-liquid layer, it is advantageous to dispose the pump at the liquid layer. Or, in case the cooling is carried out solely by circulation of the liquid layer, it is advantageous to arrange such that the whole cycle is circulated in the liquid layer.

As described above, the air conditioning apparatus utilizing a cold accumulating-cooling cycle related to the present invention is suitable for use in buildings in general, various types of construction works and so on.

What is claimed is:

1. An air conditioning apparatus utilizing a cold accumulating-cooling cycle, said apparatus comprising:
   a cold accumulating cycle (10) including a first compressor (1), a first condenser (2), a first decompressing mechanism (3) and a heat accumulator (4) for accumulating coldness;
   a cooling cycle (9) including a second compressor (5), a second condenser (6), a second decompressing mechanism (7) and an evaporator (8);
   a cold transfer circuit (11) including a heat exchanger means (8') utilizing the coldness accumulated in said heat accumulator (4);
   said cold accumulating cycle (10), cooling cycle (9) and said cold transfer circuit (11) being provided independently of each other; and
   a cooling device (13) utilizing said evaporator (8) and said heat exchanger means (8') as cooling means thereof.

2. An air conditioning apparatus utilizing a cold accumulating-cooling cycle, as defined in claim 1, wherein a plurality of said heat accumulators (4) are provided for each said first compressor (1), said first condenser (2) and for said first decompressing mechanism (3).

3. An air conditioning apparatus utilizing a cold accumulating-cooling cycle, as defined in claim 1, wherein a plurality of said evaporators (8) are provided for said second compressor (5), said second condensor (6) and for said second decompressing mechanism (7).

4. An air conditioning apparatus utilizing a cold accumulating-cooling cycle, as defined in claim 1, wherein a plurality of said first or second decompressing mechanisms (3), (7) are operatively connected with either of said first or second compressor (1), (5).

5. An air conditioning apparatus utilizing a cold accumulating-cooling cycle, as defined in claim 1, wherein cooling medium of said cold transfer circuit (11) disposed between said heat accumulator (4) and said cooling device (13) is provided independently for said cold accumulating cycle (10) and for said cooling cycle (9).

6. An air conditioning apparatus utilizing a cold accumulating-cooling cycle, as defined in claim 1, wherein said cold transfer circuit (11) utilizes heat accumulating material of said heat accumulator (4) as cooling medium.

7. An air conditioning apparatus utilizing a cold accumulating-cooling cycle, as defined in claim 1, wherein said heat accumulating material of said heat accumulator (4) comprises water.

8. An air conditioning apparatus utilizing a cold accumulating-cooling cycle, as defined in claim 1, wherein said heat accumulating material of said heat accumulator (4) comprises freon.

9. An air conditioning apparatus, as defined in claim 1, wherein said heat accumulator (4) has sufficient capacity to accumulate coldness during hours of non-peak electricity demand and to retain that cold until hours of peak electricity demand so that the accumulated coldness can be utilized for cooling during said hours of peak electricity demand.

10. An air conditioning apparatus, as defined in claim 9, wherein at least one additional set of first compressor (1), first condenser (2) and first decompressing mechanism (3) is connected to said heat accumulator (4).

11. An air conditioning apparatus, as defined in claim 9, wherein at least one additional set of second compressor (5), second condensor (6) and second decompressing mechanism (7) is connected to said first evaporator (8).

12. An air conditioning apparatus, as defined in claim 9, wherein said cooling device (13) includes a fan (12).

13. An air conditioning apparatus, as defined in claim 9, wherein said cold transfer circuit (11) includes a pump (18).

14. An air conditioning apparatus, as defined in claim 13, wherein said cold transfer circuit (11) includes a cooling medium which is forcibly supplied by said pump (18) to said heat exchanger means (8').

15. An air conditioning apparatus, as defined in claim 9, wherein the operating periods of the cold accumulating cycle (10) are independent of the operating periods of the cold transfer circuit (11), so that said cold accumulating cycle (10) may operate during said hours of non-peak electricity demand and said cold transfer circuit (11) may operate during said hours of peak electricity demand.

16. An air conditioning apparatus, as defined in claim 12, wherein said fan (12) operates to move air past both said evaporator (8) and said heat means (8').

17. An air conditioning apparatus, as defined in claim 9, wherein said heat accumulator is a concentrated accumulating tank.

* * * * *